(12) United States Patent  
Shimizu et al.

(10) Patent No.: US 6,962,667 B2  
(45) Date of Patent: Nov. 8, 2005

(54) PROCESS FOR PRODUCING POLYMER OPTICAL WAVEGUIDE

(75) Inventors: Keishi Shimizu, Ashigarakami-gun (JP); Shigemi Ohtsu, Ashigarakami-gun (JP); Kazutoshi Yatsuda, Ashigarakami-gun (JP); Eiichi Akutsu, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 261 days.

(21) Appl. No.: 10/409,152

(22) Filed: Apr. 9, 2003

(65) Prior Publication Data

US 2004/0021237 A1    Feb. 5, 2004

(30) Foreign Application Priority Data

Aug. 1, 2002    (JP) .............................. 2002-224643

(51) Int. Cl.⁷ .......................... B29D 11/00; G02B 6/18; G02B 6/10
(52) U.S. Cl. ................. 264/1.1; 264/1.24; 385/129; 385/130
(58) Field of Search .......................... 385/88, 129, 130, 385/132; 381/414; 264/1.1, 1.24, 1.27

(56) References Cited

U.S. PATENT DOCUMENTS 5,265,184 A  * 11/1993 Lebby et al. ................ 385/132  
5,345,530 A  *  9/1994 Lebby et al. ................. 385/88  
5,390,257 A  *  2/1995 Oslac et al. ................. 381/414  
5,716,556 A     2/1998 Heard ........................ 264/1.24  
6,355,198 B1    3/2002 Kim et al. ................... 264/259

FOREIGN PATENT DOCUMENTS

JP    A 10-253845    9/1998  
JP    B2 3151364    1/2001

OTHER PUBLICATIONS

Whitesides et al., "The Building of Small", Scientific American, Sep. 2001, pp. 39-47.

Michel et al., "Printing meets lithography: Soft approaches to high-resolution patterning", IBM J. RES. & DEV., vol. 45, No. 5, Sep. 2001, pp 697-719.

* cited by examiner

*Primary Examiner*—Brian Healy  
*Assistant Examiner*—Mary El-Shammaa  
(74) *Attorney, Agent, or Firm*—Oliff & Berridge, PLC

(57) ABSTRACT

A process for producing a polymer optical waveguide including the steps of: preparing a mold by applying a mold-forming resin layer onto a master template, peeling the layer from the master template to obtain a template, and cutting both ends of the template to expose a concave portion; bringing the mold into close contact with a film used for a cladding layer; introducing, by capillarity, a UV-curable resin or heat-curable resin by contacting the resin with one end of the mold; curing the introduced resin and removing the mold from the film; and forming a cladding layer on film on which the core has been formed, wherein a sectional area, a sectional shape, or both of a sectional area and a sectional shape of the core changes in a longitudinal direction of the core, and both end faces of the core have different areas.

21 Claims, 3 Drawing Sheets

PROCESS FOR PRODUCING POLYMER OPTICAL WAVEGUIDE

BACKGROUND OF THE INVENTION

1. Field of the Invention

The present invention relates to a process for producing an optical waveguide, in particular, a flexible polymer optical waveguide.

2. Description of the Related Art

As the process for producing a polymer optical waveguide, the following processes have been proposed: (1) a process comprising impregnating a film with a monomer, exposing a core portion selectively to light to change a refraction index thereof, and sticking a film thereto (selective polymerization); (2) a process comprising applying a core layer and a cladding layer, and forming a cladding portion by reactive ion etching (RIE); (3) a process employing photolithography to perform exposure and development (direct exposure) using an UV-curable resin obtained by adding a photosensitive material to a polymeric material; (4) a process employing injection molding; (5) a process comprising applying a core layer and a cladding layer, and exposing a core portion to light to change a refraction index of the core portion (photo bleaching), or the like.

However, the selective polymerization process (1) has a problem of sticking of the film, and the processes (2) and (3) involve increased costs due to use of photolithography. The process (4) has a problem of poor precision of the resultant core diameter, and the process (5) has a problem of an insufficient refraction index difference between the core layer and the cladding layer.

Currently, practically employable processes exhibiting superior performance are only the processes (2) and (3), however, these processes are associated with the aforementioned problem of increased costs. Any of the processes (1) to (5) cannot be applied to formation of a polymer optical waveguide onto a large and flexible plastic substrate.

In order to produce a polymer optical waveguide, there is known a process comprising filling into a pattern substrate (clad) that has patterned grooves to form capillaries, a polymer precursor material for a core, curing the precursor material to form a core layer, and adhering a flat substrate (clad) onto the core layer. However, this process has a problem in that the polymer precursor material is thinly supplied not only to the capillary groove but also to a space between the pattern substrate and the flat substrate entirely and thereafter cured to form a thin layer having the same composition as the core layer, whereby light leaks out through this thin layer.

As one of the methods of solving this problem, Davit Heard proposed a method comprising fixing and sticking a pattern substrate that has patterned grooves to form capillaries to a flat substrate using a clamping jig, sealing the contact portion between the pattern substrate and the flat substrate with a resin, and reducing the internal pressure to fill the capillaries with a monomer (diallyl isophthalate) solution, to thereby produce a polymer optical waveguide (Japanese Patent gazette No. 3151364). This method uses the monomer as the core forming resin material, instead of any polymer precursor material, to reduce the viscosity of the filling material and fill the capillaries with the filling material by capillarity, to thus prevent the monomer from being introduced into any other member than the capillaries.

However, this method has the following problem: because the monomer is used as the core forming material, the volume shrinkage ratio of the monomer is large when polymerized to form a polymer, and as a result, the transmission loss of the polymer optical waveguide may increase.

This method also has a problem in that due to its complicated procedure, in which the pattern substrate and the flat substrate must be fixed and stuck to each other using the clamp, and fixation at the contact portion must be sealed with the resin, it is impossible to perform mass production using this method and hence cost reduction is unexpected. Moreover, this method cannot be applied to production of the polymer optical waveguide using, as a clad, a film having a thickness in the order of millimeter or a thickness of 1 mm or less.

Recently, George M. Whitesides et al. at Harvard University has proposed a method called capillary micromold as one of soft lithographic processes so as to form a nanostructure. This method comprises forming a master substrate by photolithography, transferring the nanostructure of the master substrate onto a mold made of PDMS utilizing adhesiveness of polydimethylsiloxane (PDMS) and good peeling ability thereof, pouring liquid polymer into this mold by capillarity, and curing the polymer. A detailed review is described in SCIENTIFIC AMERICAN September 2001 (Nikkei Science, 2001, December).

Kim Enoch et al. of George M. Whitesides' group at Harvard University obtained a patent on the capillary micromold method (U.S. Pat. No. 6,355,198).

However, even if the production process disclosed in this patent is applied to production of the polymer optical waveguide, it takes a prolonged time to form its core portion since the sectional area of the core portion of the polymer optical waveguide is very small, thus making the process unsuitable for mass production. This process also has a drawback in that when a monomer solution is polymerized to form a polymer, a volume change occurs to alter the shape of the core, whereby the transmission loss increases.

B. Michel et al. at IBM Zurich Laboratory proposed a lithographic technique using PDMS, and reported that this technique achieved high resolution in the order of several tens of nanometers. A detailed review is descried in IBM J. REV. & DEV., Vol. 45 No. 5, Sep. 2001.

As described above, the soft lithographic technique using PDMS and the capillary micromold method are the focus of recent attention as nanotechnology in the United States and some other countries.

However, even when the optical waveguide is formed by a micromold method, it is impossible to simultaneously fulfil the requirements of reduced volume shrinkage ratio (reduction of transmission loss) occurred when curing and lowered viscosity of a filling liquid (the monomer, etc.) to facilitate the filling. Accordingly, if reduced transmission loss is preferentially considered, the viscosity of the filling liquid cannot be lowered to a level below a specified limit, whereby the filling speed decreases, and hence the mass production of optical waveguides cannot be expected. When the micromold method is carried out, it requires use of a glass or silicon plate as the substrate, and thus use of a flexible film substrate is not considered.

Under these circumstances, it can be considered that a method of forming a flexible polymer optical waveguide in which an optical waveguide is provided on a film substrate. This method involves simplified producing steps and allows easily production of the polymer optical waveguide at considerably reduced costs, as compared to conventional methods for producing a polymer optical waveguide.

Such a flexible polymer optical waveguide is required to have a function to allow connection to plural optical parts. Since a light emitting portion of a light emitting element and a light receiving portion of a light receiving element are different from each other in an area and a shape, it is desirable to arbitrarily change a sectional area or a sectional shape of input and output portions of the optical waveguide to achieve connection. In order to meet such a requirement, for example, a method to prepare the optical waveguide itself using an RIE process may be used.

As a process for producing a (non-flexible) polymer optical waveguide which allows connection to another optical part such as an optical fiber, for example, Japanese Patent Application Laid-Open (JP-A) No. 10-253845 discloses a process by which an optical fiber is connected to a polymer optical waveguide using photolithography. However, this process requires a patterning exposure every time, because of photolithography, when an optical waveguide is formed. In order to connect the polymer optical waveguide to the optical fiber, procedures comprising configuring a shallow liquid-collecting pool in a substrate and grooves at both sides of the pool and placing the optical fiber in the thus formed groove is adopted in this process. In such procedures, it is necessary to work not only the liquid-collecting pool but also the grooves in the substrate, to thereby increase the number of the steps. Moreover, it is necessary for each of polymer optical waveguides to be formed such that the position of the grooves is precisely matched to the photo mask. For the foregoing reasons, a problem of increased cost still remains. In order to three-dimensionally change the sectional area of the optical waveguide in the longitudinal direction, it is necessary to precisely control the depth of the shallow liquid-collecting pool, which poses another problem of a reduced yield.

SUMMARY OF THE INVENTION

The present invention has been made in light of the above-described problems and aims to achieve the following. Specifically, it is an object of the invention to provide a process for producing a polymer optical waveguide which can be readily connected to another optical part and achieves remarkably suppressed transmissional loss, in a simple manner and at very low costs.

A first aspect of the invention is a process for producing a polymer optical waveguide, which comprises the steps of:

preparing a mold by applying a mold-forming resin layer onto a master template having formed therein a convex portion for the optical waveguide, peeling the layer from the master template to obtain a template, and cutting both ends of the template to expose a concave portion for the optical waveguide that corresponds to the convex portion;

bringing the mold into close contact with a film used for a cladding layer which has good adhesiveness to the mold;

introducing, by capillarity, a UV-curable resin or heat-curable resin which forms a core into the concave portion of the mold by contacting the UV-curable resin or heat-curable resin with one end of the mold with which the film is close contact;

curing the introduced UV-curable resin or heat-curable resin, and removing the mold from the film; and forming a cladding layer on the film on which the core has been formed, wherein a sectional area, a sectional shape, or both of a sectional area and a sectional shape of the core changes in a longitudinal direction of the core, and both end faces of the core have different areas.

A second aspect of the invention is a polymer optical waveguide which comprises a flexible cladding film, a cladding layer that covers the flexible cladding film, and a core body disposed between the flexible cladding film and the cladding layer, wherein the core body comprises a curable resin and has a light receiving portion and a light emitting portion that are mutually different in sectional shape and sectional area.

BRIEF DESCRIPTION OF THE DRAWINGS

FIGS. 2A-1 to 2A-3 and 2B-1 to 2B-3 are conceptual views illustrating examples of a convex portion for an optical waveguide, which is constructed in a master template used in the invention, and examples of a core of a formed polymer optical waveguide.

FIGS. 3A-1 to 3A-3, 3B-1 to 3B-3 and 3C-1 to 3C-3 are conceptual views illustrating the step of connecting an optical fiber in the process for producing a polymer optical waveguide of the invention.

DESCRIPTION OF THE INVENTION

The process for producing a polymer optical waveguide of the present invention comprises basically the following steps of:

1) preparing a mold by applying a mold-forming resin layer onto a master template having formed therein a convex portion for the optical waveguide, peeling the layer from the master template to obtain a template, and cutting both ends of the template to expose a concave portion for the optical waveguide that corresponds to the convex portion;

2) bringing the mold into close contact with a film used for a cladding layer which has good adhesiveness to the mold;

3) introducing, by capillarity, a UV-curable resin or heat-curable resin which forms a core into the concave portion of the mold by contacting the UV-curable resin or heat-curable resin with one end of the mold with which the film is close contact;

4) curing the introduced UV-curable resin or heat-curable resin, and removing the mold from the film; and 5) forming a cladding layer on the film on which the core has been formed.

In the process for producing the polymer optical waveguide of the invention, the optical waveguide convex portion is made to have a shape, in the step 1) of preparing a master template, such that a sectional area, a sectional shape, or both of a sectional area and a sectional shape of the core to be formed in the steps 1) to 5) changes in the longitudinal direction of the core, and both end faces of the core are made to have mutually different areas.

The process for producing a polymer optical waveguide comprising the steps of 1) to 5) of the invention is based on the finding of the following facts: when a film having a good adhesiveness to a mold is brought close contact with the mold, no gap is generated between the mold and the film except for a gap generated in a concave portion structure formed in the mold, even if the two are not fixed and stuck to each other by means of specific means (e.g., fixing and sticking means as described in the aforementioned Japanese Patent No. 3151364), and consequently, an UV-curable resin or heat-curable resin can be introduced only into the concave portion. For this reason, according to the process of the invention, a polymer optical waveguide may readily be produced in a considerably simple manner and at significantly lower costs as compared to any conventional process for producing a polymer optical waveguide. Moreover, according to the process of the invention, a flexible polymer optical waveguide may be obtained which has sufficiently suppressed transmission loss, achieves high precision and can freely be mounted on any of a variety of devices. Further, the shape or the like of the polymer optical waveguide may freely be selected.

In the process for producing a polymer optical waveguide comprising the steps 1) to 5), in order to make the sectional area, the sectional shape, or both of the sectional area and the sectional shape of the core to change in the longitudinal direction of the core, and make both end faces of the core to have mutually different areas, it is necessary in the step of preparing the master template to render the optical waveguide convex portion to have a prescribed shape, by a precise working such as an RIE method or a precise machine working, photolithography, or some other means. However, the number of complicated steps can be minimized because a plurality of molds can be prepared from the master template.

Therefore, according to the invention, a flexible polymer optical waveguide which allows easy connection to any other optical part (e.g., an interchangeable diameter between different optical fibers) can readily be produced at low costs. Thus, the productivity can be enormously increased as compared to any conventional process in which photolithography must be used every time when a polymer optical waveguide is formed, as described in JP-A No. 10-253845. Since a hole formed between the concave portion in the mold and the film substrate are utilized as they are for positioning when connecting the optical part, a positioning or locating step using a V-shaped groove, as described in the above-mentioned publication, is obviated. For example, when connecting the optical fiber, which is a typical example, it is sufficient if direct insertion of the optical fiber into the hole is conducted. Since the sectional shape of the hole is usually rectangular, gaps are generated at right-angled corners in the hole when the optical fiber is inserted therein. As a result, the UV-curable resin or the like can be introduced into the hole even in such a state that the optical fiber is being inserted therein.

Referring to FIGS. 1A to 1G, basic steps of the process for producing a polymer optical waveguide of the invention will be explained.

Figure 1A:
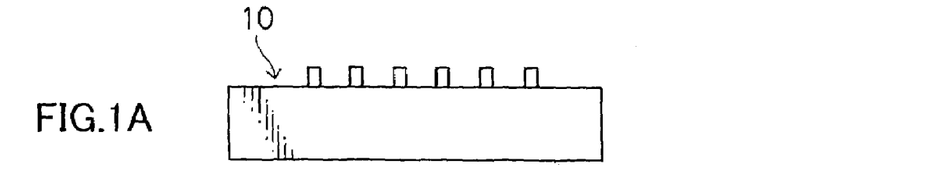
FIGS. 1A to 1G are basic conceptual views illustrating a process for producing a polymer optical waveguide of the present invention.
Figure 1B:
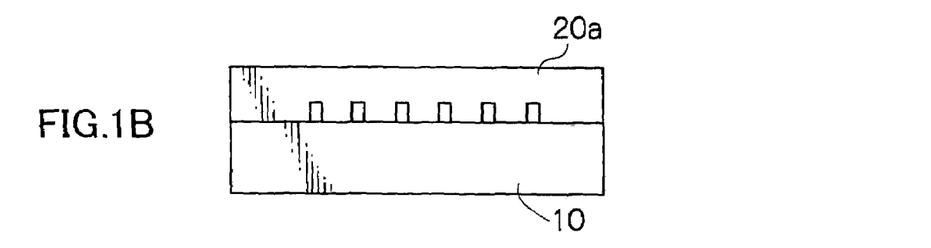
Figure 1C:
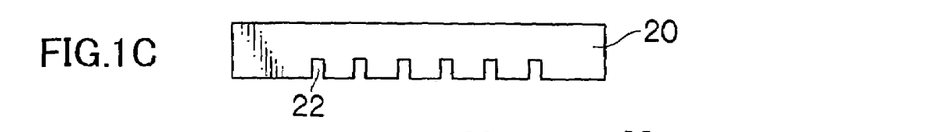

FIG. 1A illustrates a master template 10, to be detailed below, in which convex portions 12 for optical waveguides are formed. As illustrated in FIG. 1B, a mold-forming resin layer 20a (e.g., a layer obtained by curing a curable resin) is firstly formed on a face on which the optical waveguide convex portions 12 of the master template 10 are formed. Next, the mold-forming resin layer 20a is peeled from the master template 10 (template formation). Thereafter, both ends of the template are cut (not shown) in such a manner that concave portions 22, which are formed in the template to correspond to the optical waveguide convex portions, are exposed to thereby obtain a mold 20 (see FIG. 1C).

Figure 1D:
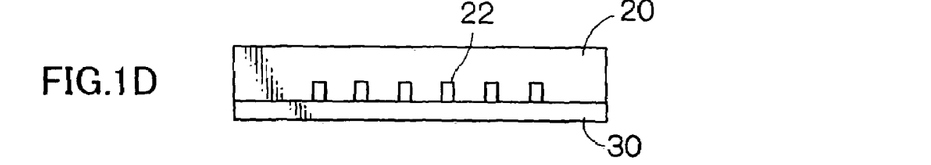
Figure 1E:
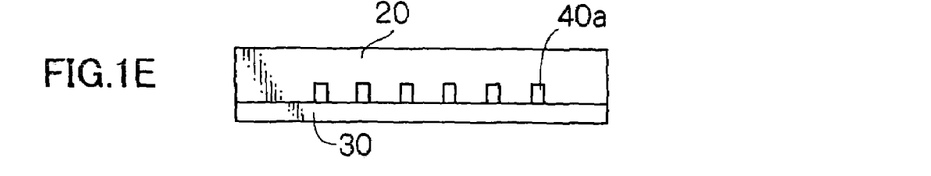
Figure 1F:
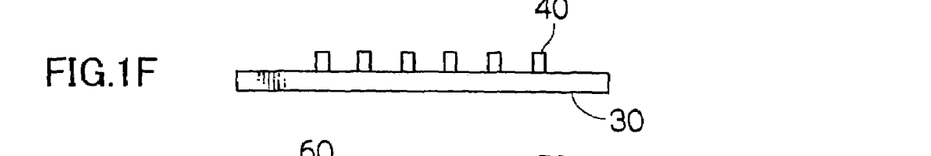

Then, a film 30, which has good adhesiveness to the thus-formed mold, is brought into close contact with the mold (see FIG. 1D). Next, one end of the mold is brought into contact with a curable resin 40a so that the resin is introduced, by capillarity, into concave portions 22 of the mold. FIG. 1E illustrates a state that the curable resin is filled into the concave portions of the mold. Thereafter, the curable resin present in the concave portions is cured, and the mold is peeled off (not shown). As illustrated in FIG. 1F, convex portions (core) 40 for optical waveguides are formed on the film.

Figure 1G:
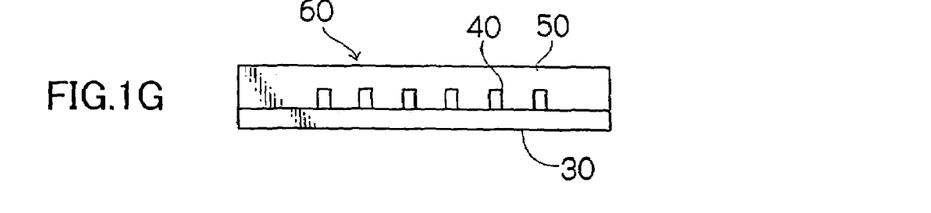

Then, by forming a cladding layer 50 on the film at a face provided with the cores, the polymer optical waveguide 60 of the invention is finally produced (see FIG. 1G).

Next, each step of the process for producing a polymer optical waveguide according to the invention will be described.

1) The step of preparing a mold by applying a mold-forming resin layer onto a master template in which a convex portion for an optical waveguide has been formed, peeling the layer from the master template to obtain a template, and then cutting both ends of the template to expose a concave portion corresponding to the optical waveguide convex portion formed in the template:

<Formation of a Master Template>

In the step of forming a master template in the process of the invention, a convex portion for an optical waveguide, which is to be formed on the master template, is formed in such a manner that the sectional area, the sectional shape, or both of the sectional area and the sectional shape of the core to be formed in the following steps 2) to 5) changes in the longitudinal direction of the core and both end faces of the core have mutually different areas.

FIGS. 2A-1 to 2A-3 and 2B-1 to 2B-3 schematically illustrate master templates each having a convex portion for an optical waveguide, the sectional area which changes continuously in the longitudinal direction, and polymer optical waveguides formed using the master templates, in which their sectional area changes continuously in the longitudinal direction and both end faces of the core have mutually different areas. (FIG. 2 illustrate a template having a single optical waveguide concave portion, but this is only illustrative and the number of the concave portions is not always one.)

Figure 2A:
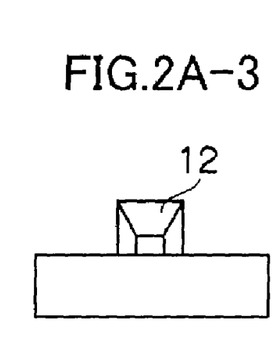
Figure 2A:
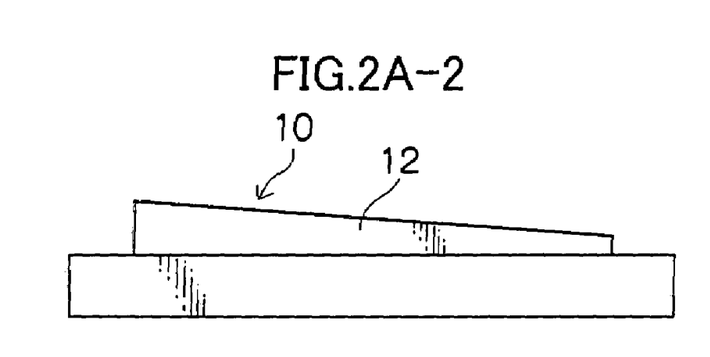
Figure 2A:
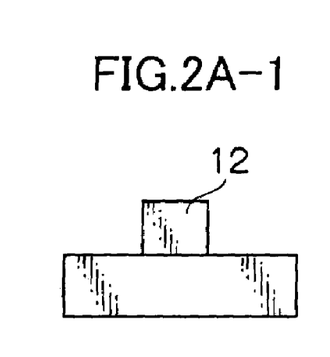
Figure 2B:
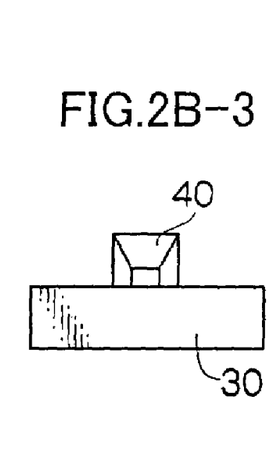
Figure 2B:
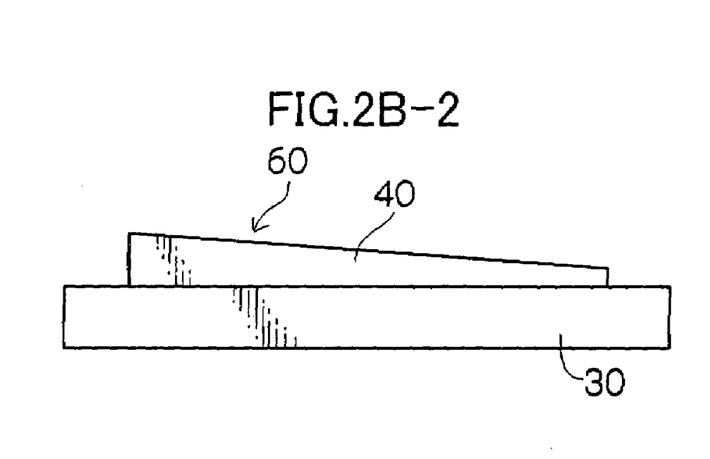
Figure 2B:
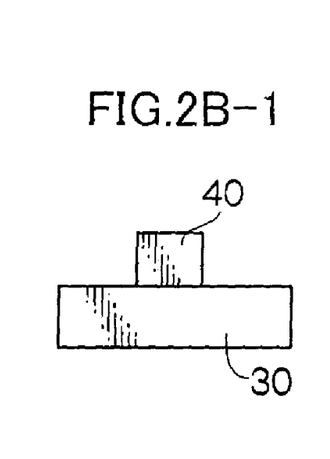

FIGS. 2A-1 and 2A-3 illustrate both side views of an optical waveguide convex portion 12 of the master template 10, which are viewed from both sides of the longitudinal direction. FIG. 2A-2 illustrates a sectional view along the longitudinal direction of the optical waveguide convex portion 12 of the master template 10.

FIGS. 2B-1 and 2B-3 illustrate both side views of a core 40 of a polymer optical waveguide 60, which are viewed from both sides of the longitudinal direction. FIG. 2B-2 illustrates a sectional view along the longitudinal direction of the core 40 of the polymer optical waveguide 60. As illustrated in FIG. 2, the areas of both the end faces of the core are mutually different.

The change in the sectional area of the polymer optical waveguide convex portion (i.e., the core) needs not be always continuous. For example, in order to minimize the loss of guided waves when interchanging the diameter of the optical fiber, it is desirable that the sectional area, the sectional shape, or both sectional area and sectional shape changes continuously in the longitudinal direction. However, this requirement is not applied to the case where a branched waveguide is formed.

The area and the shape of the end faces of the core are appropriately determined, considering the optical part to be connected thereto. Since in the subsequent steps, both ends are cut to expose the concave portion to prepare the mold, or alternatively, a curable resin is filled and cured and subsequently the formed polymer optical waveguide is cut into an appropriate size, the polymer optical waveguide convex portion is configured considering these steps.

In order to prepare the master template in which the polymer optical waveguide convex portion (corresponding to the core) is formed, any conventional method, such as an RIE process or a mechanical working capable of a high surface precision, can be used without any restriction. In the case where it is unnecessary to change the layer thickness of the polymer optical waveguide convex portion, the master template can readily be prepared by photolithography including the steps of spin-coating a thick layer of a resist (SU-8) and subsequently exposing the resist to light.

<Formation of a Template>

A template is obtained by forming a mold-forming resin layer onto the master template as prepared above, and then peeling the layer.

It is preferred that the mold-forming resin layer can easily be peeled from the master template and the layer exhibits a mechanical strength and dimensional stability over a predetermined level to serve as the mold (to be used repeatedly). The mold-forming resin layer is made of a mold-forming resin or a product in which various additives are optionally incorporated therein.

Since respective shapes of the individual optical waveguides formed in the master template must be precisely transferred to the mold-forming resin, it is preferred that the resin has a viscosity below a certain lower limit, for example, a viscosity from about 2,000 to about 7,000 mPa·s. A solvent capable of adjusting the viscosity may be added thereto to an extent that undesirable effects are not exerted by the solvent.

As the mold-forming resin, a curable silicone resin (of a heat-curing type or room-temperature curing type) is preferably used from the viewpoint of peeling ability, mechanical strength and dimensional stability. Among the aforementioned resins, a liquid-type resin having a low molecular weight is preferably used since the resin exhibits sufficient permeability. The viscosity of the resin is preferably from 500 to 7,000 mPa·s, more preferably from 2,000 to 5,000 mPa·s.

As the curable silicone resin, a silicone resin having a methylsiloxane group, an ethylsiloxane group or a phenylsiloxane group, is preferred. A curable dimethylsiloxane resin is particularly preferred.

It is desirable that the master template is beforehand subjected to a releasing treatment, such as coating with a releasing agent, to facilitate the peeling ability of the master template from the mold.

In order to apply the mold-forming resin layer onto the optical waveguide surface of the master template, a layer of the mold-forming resin is formed by coating, casting or some other methods, and subsequently the layer is subjected to drying treatment, curing treatment and some other treatments as necessary.

The thickness of the mold-forming resin layer is appropriately determined, considering the handling property of the template. Usually, the suitable thickness is from about 0.1 to 50 mm.

Thereafter, the mold-forming resin layer is peeled form the master template to obtain the template.

<Preparation of a Mold>

Next, both ends of the template are cut in such a manner that a concave portion corresponding to the optical waveguide convex portion formed in the template is exposed, to thereby prepare a mold. The reason why both ends of the template are cut to expose the concave portion lies in that an UV-curable resin or heat-curable resin should be introduced, by capillarity, into the concave portion of the mold in the subsequent step.

The surface energy of the mold is preferably from 10 to 30 dyn/cm, more preferably form 15 to 24 dyn/cm from the viewpoint of the adhesiveness to a substrate film.

The Share rubber hardness of the mold is preferably from 15 to 80, more preferably from 20 to 60 from the viewpoint of template-preparing performance or peeling ability.

The surface roughness (root mean square roughness (RMS)) of the mold is preferably 0.5 $\mu$m or less, preferably 0.1 $\mu$m or less in view of template-preparing performance.

2) The step of bringing the mold into close contact with a film which has good adhesiveness to the mold:

Since the optical waveguide of the invention may also be used as an optical interconnection between a coupler and a board, an optical branching filter, or the like, the material for the film is selected depending on use purposes, considering optical properties such as refractive index, light transparency, mechanical strength, heat resistance, adhesiveness to the mold, the flexibility of the material, or the like. It is preferred to produce a polymer optical waveguide having flexibility using a flexible film substrate. Examples of the film include an alicyclic acryl film, an alicyclic olefin film, a cellulose triacetate film and a fluorine-containing resin film. The refractive index of the film is preferably less than 1.55, more preferably less than 1.53 in order to ensure a difference in the refractive index from the core.

As the alicyclic acryl film, OZ-1000, OZ-1100 or the like, in which an aliphatic cyclic hydrocarbon such as tricyclodecane is introduced as an ester substituent, is used.

Examples of the alicyclic olefin film include a film having a norbornene structure in a main chain thereof, and a film having a norbornene structure in a main chain and a polar group such as an alkyloxycarbonyl group (its alkyl group: a cycloalkyl group having 1 to 6 carbon atoms) in a side chain thereof. An alicyclic olefin resin having a norbornene structure in a main chain and a polar group such as an alkyloxycarbonyl group in a side chain thereof has superior optical properties such as a low refractive index (refractive index: about 1.50, which ensures a difference in the refractive index between the core and the clad) and a high light transparency, and is excellent in adhesiveness to the mold and heat resistance, and hence, this film is particularly suitable for producing a polymer optical waveguide of the invention.

The thickness of the film is appropriately selected, considering flexibility, rigidity and easiness for the handling thereof, and so on. Usually, the thickness is desirably from about 0.1 to 0.5 mm.

3) The step of introducing, by capillarity, a UV-curable resin or heat-curable resin which forms a core into the concave portion of the mold by contacting the UV-curable resin or heat-curable resin with one end of the mold with which the film is close contact:

In this step, in order to fill the UV-curable resin or heat-curable resin into a gap (the concave portion of the mold) generated between the mold and the film by capillarity, it is required that the UV-curable resin or heat-curable resin has a sufficiently low viscosity to allow sufficient filling and that the refractive index of the curable resin after being cured is higher than that of the polymeric material to constitute a clad (the difference in the refractive index from the clad: 0.02 or greater). In order to reproduce the original shape of the optical waveguide convex portion formed in the master template with a high precision, it is also necessary that a change in volume of the curable resin before and after being cured is small. For example, as the volume decreases, a loss of guided waves is caused. Accordingly, the volume change of the curable resin is desirably as small as possible, with preferably being 10% or less, more preferably 6% or less. Use of a solvent to reduce the viscosity is desirably avoided, because the volume change of the resin increases before and after being cured.

The viscosity of the curable resin is preferably specified to a range of 10 to 2,000 mPa·s, more preferably of 20 to 1,000 mPa·s, and still more preferably of 30 to 500 mPa·s.

As the UV-curable resin, an epoxy-based, polyimide-based or acryl-based UV-curable resin is preferably used.

In this step, in order to facilitate introducing, by capillarity, the UV-curable resin or heat-curable resin into the concave portion of the mold by contacting the UV-curable resin or heat-curable resin which will become the core with one end of the mold with which the film is close contact, it is desirable to reduce the pressure in this entire system (to a level of about 0.1 to 200 Pa). Instead of reducing the pressure in this entire system, it is possible to evacuate the air from the system by pumping from one end of the mold opposite to the end in contact with the curable resin or to apply pressure to the system at the end in contact with the curable resin.

In order to facilitate the filling, it is effective to heat the curable resin in contact with one end of the mold, instead of or in addition to the above-mentioned pressure reduction or pressure application, thereby reducing the viscosity of the curable resin.

It is necessary that the refractive index of the cured UV-curable resin or heat-curable resin, which is used to form the core, is larger than that of the film substrate (including a cladding layer (referred to in the step 5) below), which will become a clad. The refractive index is 1.53 or greater, preferably 1.55 or greater. The difference in the refractive index between the clad (including the cladding layer (referred to in the step 5)) and the core is 0.02 or greater, preferably 0.05 or greater.

4) The step of curing the introduced UV-curable resin or heat-curable resin, and removing the mold from the film:

The introduced UV-curable resin or heat-curable resin is subjected to curing. In order to cure the UV-curable resin, an ultraviolet lamp, an ultraviolet LED, a UV radiating device or the like is used. Curing of the heat-curable resin is effected by heating in an oven or some other means.

The mold employed in the above-mentioned steps 1) to 3) can also be used, as it is, in the cladding layer. In such a case, it is unnecessary remove the mold, and the mold is used as it is as the cladding layer.

5) The step of forming a cladding layer on the film on which the core has been formed:

A cladding layer is formed on the film on which the core has been formed. Examples of the cladding layer include a film (e.g., a film substrate as employed in the step 2) is used in the same manner); a layer produced by applying a curable resin (an UV-curable resin or heat-curable resin) onto the substrate and then curing the applied resin; and a polymeric film obtained by applying a solution of a polymeric material dissolved in a solvent onto the substrate and then drying the applied solution. In the case where the film is used as the cladding layer, the film is adhered to the substrate using an adhesive. Incidentally, the refractive index of the adhesive agent is desirably close to that of the film.

In order to secure a difference in the refractive index between the cladding layer and the core, the refractive index of the cladding layer is preferably less than 1.55, more preferably less than 1.53. The refractive index of the cladding layer is preferably made to be equal to that of the film from the viewpoint of light confinement.

In the process for producing the polymer optical waveguide according to the invention, a combined use of, in particular, a heat-curable silicone resin (in particular, a heat-curable dimethylsiloxane resin) as the mold-forming material and an alicyclic olefin resin having a norbornene structure in a main chain and an alkyloxycarbonyl group in a side chain thereof as the film can provide a very high adhesion between the two resins. As a result, even if the sectional area of the concave portion structure is very small (e.g., a 10 $\mu$m×10 $\mu$m square), the curable resin can be filled rapidly into the concave portion by capillarity.

The mold can also be used as the cladding layer. In such a case, in order to make the refractive index of the mold to be 1.5 or less and improve the adhesiveness between the mold and the core material, the mold is preferably subjected to ozone treatment.

[Connection to Other Optical Parts]

According to the process of the invention, it is possible to readily produce the polymer optical waveguide which allows connection to other optical parts such as an optical fiber, a light emitting element, a light receiving element or a condensing lens, or to produce the polymer optical waveguide with one of the aforementioned optical parts connected thereto, by connecting the other optical part to the polymer optical waveguide during the production process thereof.

For example, in order to connect two optical fibers that have mutual different diameters (to allow interconnection among mutual different diameters), a master template and a mold are prepared considering the diameters of the two optical fibers, after which a fiber-connecting step can be readily integrated into the subsequent procedures. FIGS. 3A-1 to 3A-3, 3B-1 to 3B-3 and 3C-1 to 3C-3 illustrate an embodiment thereof. FIG. 3 illustrate the step of inserting optical fibers having different diameters into both end portions of a hole, that is produced between the mold formed using a master template as illustrated in FIG. 2 and the film substrate, from the ends of the hole, before or after the UV-curable resin or heat-curable resin is introduced into the hole by capillarity. Thereafter, the curable resin, filled before or after inserting the optical fibers, is cured. Consequently, the inserted optical fibers are connected to the core at the end face portion of the core.

Figure 3A:
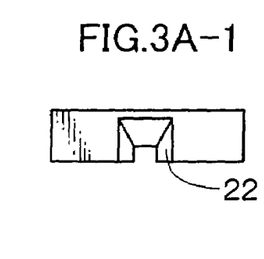
Figure 3A:
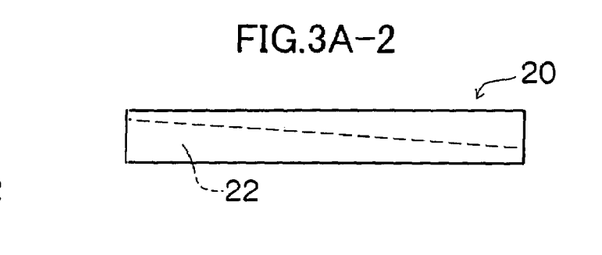
Figure 3A:
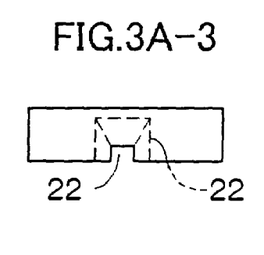
Figure 3B:
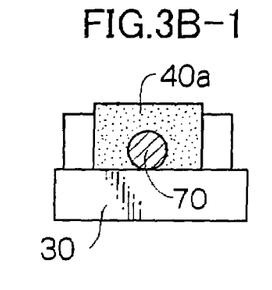
Figure 3B:
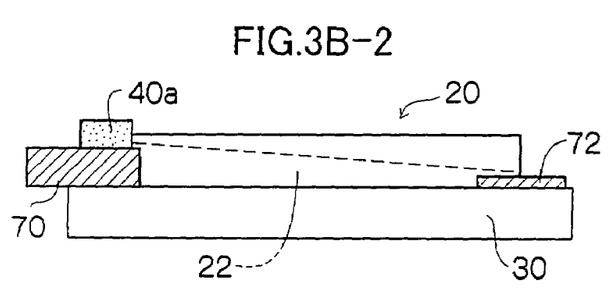
Figure 3B:
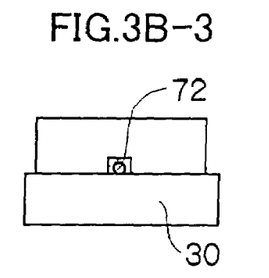
Figure 3C:
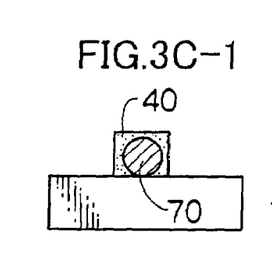
Figure 3C:
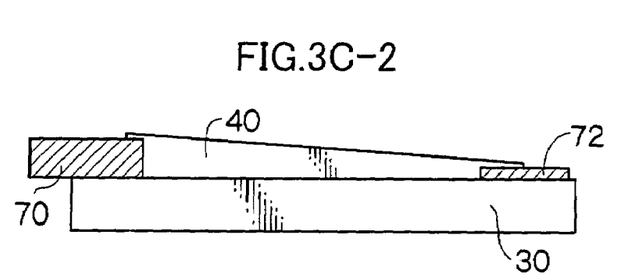
Figure 3C:
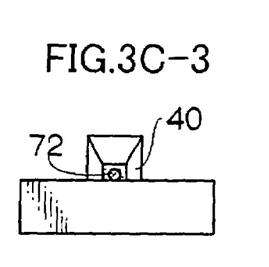

FIGS. 3A-1 and 3A-3 illustrate both side views of the concave portion 22 of a mold 20, which are viewed from both sides of the longitudinal direction. FIG. 3A-2 illustrates a sectional view along the longitudinal direction of the concave portion 22 of the mold 20. (FIG. 3 illustrate a template having a single concave portion, but this is only illustrative and the number of the concave portions is not always one.) Next, as illustrated in FIGS. 3B-1 and 3B-3, optical fibers 70 and 72 having different diameters are inserted into the concave portion at both end portions of the mold. Thereafter, the UV-curable resin or heat-curable resin 40a is brought into contact with one end of the mold. The curable resin is introduced into the concave portion of the mold by capillarity (not shown). The optical fiber may be inserted after the curable resin has been filled into the concave portion of the mold. Then, the curable resin is cured and the mold is peeled. As a result, a polymer optical waveguide is produced in which the optical fibers 70 and 72 having the different diameters are connected to the optical waveguide 40, as illustrated in FIGS. 3C-1 to 3C-3.

It is necessary to configure the sectional shape and the sectional area at both end faces of the concave portion of the mold such that the optical fiber can be inserted thereto.

According to the process of the invention, it is possible to produce a polymer optical waveguide which can easily be connected to a light emitting element, a light receiving element or some other elements, such as a surface emitting laser array (for example, VCSEL manufactured by Fuji Xerox Co., Ltd.) without adding any special lens system. Also in this case, the master template and the mold are formed by considering a laser spot diameter of the light emitting element and so forth.

Since semiconductor laser elements of the surface emitting laser array generate a large amount of exothermic heat, in order to prevent undesirable effects by the generated heat, it is necessary to keep an interval between the semiconductor laser elements and the core end faces to dissipate the heat. However, the semiconductor laser beam has a widening angle, and hence, if the interval exceeds a specified limit, the laser spot diameter at the core end face will increase over an acceptable value for the core (the acceptable laser spot diameter is 45 μm when the core diameter is 50 μm).

However, if the laser spot diameter of the semiconductor laser and the widening angle of the laser beam in the surface emitting laser array are appropriately selected, the interval between the semiconductor laser and the core end face can be secured to a degree to sufficiently avoid the effects of the exothermic heat, even if the above-mentioned lens or the like is not set up.

For example, when a surface emitting laser array (VCSEL-AM-0104, manufactured by Fuji Xerox Co., Ltd.), in which the spot diameter of a semiconductor laser is 10 μm, the beam widening angle is 25° and the array interval is 250 μm, is mount on an end face of a multimode polymer optical waveguide sheet having a core diameter of 50 μm, the laser spot diameter at the core end face may increase up to about 45 μm, and hence, the interval between the semiconductor laser and the core end face may increase up to 79 μm. If the laser spot diameter at the core end face is specified to be 30 μm, the interval between the semiconductor laser and the core end face is about 45 μm. When such an interval is produced, heat can be sufficiently dissipated although the temperature of the semiconductor laser elements may be elevated to about 100° C.

Therefore, the spot diameter of the semiconductor laser in the surface emitting laser array is preferably from about 1 to 20 μm, and the widening angle of the laser beam is preferably from 5 to 30°. The array interval is preferably from about 100 to 500 μm. For example, VCSEL-AM-0104, VCSEL-AM-0112 and the like, which are manufactured by Fuji Xerox Co., Ltd. are preferably employed.

In order to secure interval between the core end face of the optical waveguide sheet and the semiconductor laser of the surface emitting laser array, a frame having a height sufficient to maintain the aforementioned interval may be fitted to the surface emitting laser array. In order to fix the frame to the optical waveguide sheet, the adhesive or the like is used.

The optical element of the invention may be provide with a light receiving portion as well as a light emitting portion. As the light emitting portion, a photodiode array and the like is preferably used. It is preferable that the photodiode array is highly sensitive to light having the same wavelength range in an ultraviolet region as the surface emitting laser array has, such as an Si photodiode array or a GaAs photodiode array.

Preferable embodiments for producing a polymer optical waveguide of the invention will be described below.

It is preferred that the change in sectional area, sectional shape or both of sectional area and sectional shape of the core is continuous in the longitudinal direction.

It is preferred that at least one of the two end faces of the core has a larger area than an area of an optical part to be connected thereto.

It is preferred that the optical part is any one of an optical fiber, a light emitting element, a light receiving element and a condensing lens.

It is preferred that at least one of two end faces of the concave portion of the mold has the same sectional shape and sectional area as an optical part to allow insertion thereof, and in the step (3) of the process, the optical part is inserted from the end face of the concave portion before or after the UV-curable resin or heat-curable resin is introduced, by capillarity, into the concave portion of the mold.

It is preferred that the cladding layer is formed by applying a UV-curable resin or heat-curable rein, and curing the resin.

It is preferred that the cladding layer is formed by adhering a cladding film using an adhesive that has a refractive index close to that of the film.

It is preferred that the mold-forming resin layer is obtained by curing a curable silicone resin.

It is preferred that the mold has a surface energy of 10 to 30 dyn/cm.

It is preferred that the mold has a Share rubber hardness of 15 to 80.

It is preferred that the mold has a surface roughness of 0.5 μm or less.

It is preferred that the mold has a thickness of 0.1 to 50 mm.

It is preferred that the film has a refractive index of 1.55 or less.

It is preferred that the film comprises an alicyclic olefin resin film.

It is preferred that the alicyclic olefin resin film has a norbornene structure in a main chain thereof and a polar group in a side chain thereof.

It is preferred that the UV-curable resin or heat-curable resin has a viscosity of 10 to 2,000 mPa·s.

It is preferred that a change in volume caused by curing the UV-curable resin or heat-curable resin is 10% or less.

It is preferred that a refractive index of the cladding layer is the same as that of the film.

It is preferred that a refractive index of the UV-curable resin or heat-curable resin after being cured is 1.55 or greater.

It is preferred that a difference between a refractive index of the film and the cladding layer and a refractive index of the core is 0.02 or greater.

EXAMPLES

The present invention will be more specifically described hereinafter by way of the following examples, but the invention is not limited to these examples.

Example 1

A quartz glass substrate was subjected to an RIE process to produce a master template having four optical waveguide convex portions, as illustrated in FIGS. 2A-1 to 2A-3. The length of the optical waveguide convex portion was 50 mm, and a sectional shape thereof was a square. A side length of the square of one end face of the convex portion was 80 μm, and another side length of the square of the other end face was 20 μm. The convex portion had a sectional area continuously changing from one end face to the other end face.

Then, a releasing agent was coated onto this master template, followed by filling a heat-curable dimethylsiloxane resin (SYLGARD 184, manufactured by Dow Corning Asia Co.) thereinto. The filled resin was cured by heating at 120° C. for 30 minutes. Thereafter, the cured resin was peeled to obtain a template (thickness: 3 mm) that had concave portions each having a continuously changing sectional area. Then, both ends of the template was cut to form input and output portions for introducing an UV-curable resin to be described below, to thereby prepare a mold.

This mold was brought close contact with a film (Arton film, manufactured by JSR Corp., refractive index: 1.510) which had a larger size than the size of the mold, with a thickness being 188 μm. Then, several droplets of the UV-curable resin (PJ3001, manufactured by JSR Corp.) having a viscosity of 1,300 mPa·s were supplied into the input and output portions which had been provided at one end of the mold, whereupon the UV-curable resin was introduced into the concave portions by capillarity. Subsequently, the mold was exposed to UV light at an intensity of 50 mW/cm$^2$ for 10 minutes, so as to cure the UV-curable resin. The mold was peeled from the Arton film, whereby the cores having the same shape as the convex portions of the master template were formed on the Arton film. The refractive index of the cores was 1.591.

Next, an UV-curable resin (manufactured by JSR Corp.) having a refractive index after cured of 1.510, which was the same as that of the Arton film, was applied to the entirety of the core-formed surface of the Arton film. Then, the resin was irradiated with UV light at an intensity of 50 mW/cm$^2$ for 10 minutes to cure the resin (film thickness after cured: 10 μm). In this way, cladding layers (cladding layers at a side face and an upper face) were formed to thus produce a flexible polymer optical waveguide.

Then, a 1×4 surface emitting laser array (VCSEL-AM-0104, manufactured by Fuji Xerox Co., Ltd., spot diameter of the semiconductor laser: 10 μm, beam widening angle: 30°, and array interval: 250 μm) was fitted to the thus produced polymer optical waveguide at one end face of the cores with a gap having a size of 40 μm. The positioning acceptable tolerance in this case was 40 μm, whereby it was possible to arrange the laser array by positioning based on mechanical matching. Furthermore, the connecting efficiency was improved since the outlet of the laser beams was narrowed. A light receiving element (a silicon photo detector, manufactured by Hamamatsu Photonics K.K.) was directly fitted to the other end face of the cores.

Example 2

A master template and a mold were prepared in the same manner as in Example 1, except that the length of optical waveguide convex portions configured in the master template was 50 mm, and a sectional shape thereof (a square) had a side length at one end face of 72 μm and another side length at the other end face of 60 μm.

This mold was brought close contact with a film (Arton film, manufactured by JSR Corp., refractive index: 1.510) having a larger size than the size of the mold, with a thickness being 188 μm.

GI type optical fibers each having diameters of 62.5 μm and 50 μm were inserted, by about 1 mm, into a hole made between the mold and the film. Then, several droplets of an UV-curable resin (manufactured by NTT-AT Co.) having a viscosity of 300 mPa·s were supplied into one end of the mold (the end having a larger sectional area of the hole), whereupon the resin was introduced, by capillarity, from the gap between the hole and the optical fibers.

Subsequently, the resin was irradiated with UV light from the mold side at an intensity of 50 mW/cm$^2$ for 10 minutes, so as to effect curing. The mold was peeled from the Arton film, whereby the core having a refractive index of 1.591 was formed on the Arton film. Subsequently, the optical fibers having the different diameters were connected to both ends of the hole.

An UV-curable resin having a refractive index of 1.510, which was the same as that of the Arton film, was applied to this core-formed surface. Then, the resin was irradiated with UV light at an intensity of 50 mW/cm$^2$ for 10 minutes to effect curing. In this way, cladding layers (cladding layers at a side face and an upper face) were formed, to thus produce a flexible polymer optical waveguide which had an interchangeable diameter for the optical fiber.

According to the invention, the flexible polymer optical waveguide which allows easily connection to other optical parts may readily be produced at very low costs. By employing the process of the present invention, the productivity of the polymer optical waveguide can be considerably increased as compared to the conventional processes in which photolithography must be used every time when producing the polymer optical waveguide as described in JP-A No. 10-253845.

What is claimed is:

1. A process for producing a polymer optical waveguide, comprising the steps of:
   preparing a mold by applying a mold-forming resin layer onto a master template having formed therein a convex portion for the optical waveguide, peeling the layer from the master template to obtain a template, and cutting both ends of the template to expose a concave portion for the optical waveguide that corresponds to the convex portion;
   bringing the mold into contact with a film used for a cladding layer which has a good adhesiveness to the mold;
   introducing, by capillarity, a UV-curable resin or heat-curable resin which forms a core into the concave portion of the mold by contacting the UV-curable resin or heat-curable resin with one end of the mold with which the film is close contact;
   curing the introduced UV-curable resin or heat-curable resin, and removing the mold from the film; and
   forming a cladding layer on the film on which the core has been formed,
   wherein a sectional area, a sectional shape, or both of a sectional area and a sectional shape of the core changes in a longitudinal direction of the core, and both end faces of the core have different areas.

2. The process for producing a polymer optical waveguide according to claim 1, wherein the change in sectional area, sectional shape or both of sectional area and sectional shape of the core is continuous in the longitudinal direction.

3. The process for producing a polymer optical waveguide according to claim 1, wherein at least one of the two end faces of the core has a larger area than an area of an optical part to be connected thereto.

4. The process for producing a polymer optical waveguide according to claim 3, wherein the optical part is any one of an optical fiber, a light emitting element, a light receiving element and a condensing lens.

5. The process for producing a polymer optical waveguide according to claim 1, wherein at least one of two end faces of the concave portion of the mold has the same sectional shape and sectional area as an optical part to allow insertion thereof, and the process further comprises a step of inserting the optical part from the end face of the concave portion before or after introducing, by capillarity, the UV-curable resin or heat-curable resin into the concave portion of the mold.

6. The process for producing a polymer optical waveguide according to claim 1, wherein the cladding layer on the film is formed by applying a UV-curable resin or heat-curable resin, and curing the resin.

7. The process for producing a polymer optical waveguide according to claim 1, wherein the cladding layer on the film is formed by adhering another film used for a cladding layer using an adhesive that has a refractive index close to that of the film.

8. The process for producing a polymer optical waveguide according to claim 1, wherein the mold-forming resin layer is obtained by curing a curable silicone resin.

9. The process for producing a polymer optical waveguide according to claim 1, wherein the mold has a surface energy of 10 to 30 dyn/cm.

10. The process for producing a polymer optical waveguide according to claim 1, wherein the mold has a Share rubber hardness of 15 to 80.

11. The process for producing a polymer optical waveguide according to claim 1, wherein the mold has a surface roughness of 0.5 µm or less.

12. The process for producing a polymer optical waveguide according to claim 1, wherein the mold has a thickness of 0.1 to 50 mm.

13. The process for producing a polymer optical waveguide according to claim 1, wherein the film has a refractive index of 1.55 or less.

14. The process for producing a polymer optical waveguide according to claim 1, wherein the film comprises an alicyclic olefin resin film.

15. The process for producing a polymer optical waveguide according to claim 14, wherein the alicyclic olefin resin film has a norbornene structure in a main chain thereof and a polar group in a side chain thereof.

16. The process for producing a polymer optical waveguide according to claim 1, wherein the UV-curable resin or heat-curable resin has a viscosity of 10 to 2,000 mPa·s.

17. The process for producing a polymer optical waveguide according to claim 1, wherein a change in volume caused by curing of the UV-curable resin or heat-curable resin is 10% or less.

18. The process for producing a polymer optical waveguide according to claim 1, wherein a refractive index of the cladding layer is the same as that of the film.

19. The process for producing a polymer optical waveguide according to claim 1, wherein a refractive index of the UV-curable resin or heat-curable resin after being cured is 1.55 or greater.

20. The process for producing a polymer optical waveguide according to claim 1, wherein a difference between a refractive index of the film and the cladding layer and a refractive index of the core is 0.02 or greater.

21. A polymer optical waveguide produced by the process of claim 1.

* * * * *